United States Patent [19]
Rudi

[11] Patent Number: 5,982,576
[45] Date of Patent: Nov. 9, 1999

[54] MULTIPLE TAPE CARTRIDGE AND DRIVE FOR CONCURRENT RECORDING WITH THE TAPES DISPOSED IN THE CARTRIDGE

[75] Inventor: Guttorm Rudi, Fjelhamar, Norway

[73] Assignee: Tandberg Data ASA, Oslo, Norway

[21] Appl. No.: 09/041,689

[22] Filed: Mar. 13, 1998

[51] Int. Cl.[6] .................................................. G11B 23/08
[52] U.S. Cl. .......................................... 360/96.1; 360/132
[58] Field of Search .................................. 360/96.1, 132; 242/346

[56] References Cited

U.S. PATENT DOCUMENTS

| | | | |
|---|---|---|---|
| 4,000,519 | 12/1976 | Turk | 360/132 |
| 4,170,407 | 10/1979 | Stella | 352/72 |
| 4,199,794 | 4/1980 | Pfost et al. | 360/92 |

FOREIGN PATENT DOCUMENTS

| | | |
|---|---|---|
| 1-066884 | 3/1989 | Japan . |
| 1-066885 | 3/1989 | Japan . |
| 1 592 986 | 7/1981 | United Kingdom . |
| 2 140 778 | 12/1984 | United Kingdom . |

*Primary Examiner*—William J. Klimowicz
*Attorney, Agent, or Firm*—Hill & Simpson

[57] ABSTRACT

Access time to data recorded on a tape in a tape cartridge is improved in a multi-tape cartridge and a drive for the multi-tape cartridge wherein a number of tapes having data recorded thereon are wound around hubs in the cartridge, and the tapes are separated as they traverse an opening in the cartridge. The drive system has multiple data transfer heads which are insertable into the opening in the cartridge and respectively engage the tapes in the cartridge. Data can be simultaneously transferred between the tapes and the heads. In comparison to a single tape having a given length, the multiple tapes in the cartridge can be shortened in length by a factor equal to the number of tapes, and the access to data recorded on the tapes is correspondingly faster by the same factor.

27 Claims, 8 Drawing Sheets

MULTIPLE TAPE CARTRIDGE AND DRIVE FOR CONCURRENT RECORDING WITH THE TAPES DISPOSED IN THE CARTRIDGE

BACKGROUND OF THE INVENTION

1. Field of the Invention

The present invention is directed to a tape cartridge and a tape drive, such as a magnetic tape cartridge and a drive of the type known as a tape "streamer," and in particular to a tape cartridge containing multiple tapes and a drive having multiple data transfer heads respectively engageable with multiple tapes.

2. Description of the Prior Art

The need for storing all types of digital information is increasing rapidly. Magnetic tape is by far the least expensive high-capacity medium available today for digital information storage. The suppliers of tape drive and tape medium are always striving to develop new drives with increased storage capacity, shorter access time and higher data rates.

A primary advantage of tape, in addition to its low cost, as an information storage medium is its relatively large recording surface area.

A significant disadvantage of tape as an information storage medium is that tape is a sequential medium. This means that when a data transfer head, such as a read/write head being operated as a read head, is located at a beginning of a tape, it is necessary for the tape to pass along virtually its entire tape length in order to retrieve information at the end of the tape. The access time associated with tape is therefore much longer than the access time associated with hard disks, optical disks and flexible (floppy) disks.

Access time associated with a tape can, at least in theory, be improved by making the tape wider and shorter, so that it takes less time to transport the tape to reach the end of the tape in order to retrieve information located at the end of the tape. There are, however, practical limits to making a tape wider and shorter.

One problem is that the dimensions of the tape, and consequently the dimensions of the cartridge containing the tape, have an influence on the form factor of the drive. A wider tape requires an increased form factor. Consistent with current marketplace desires, the current trend in the industry, however, is to reduce the form factor. Moreover, in library systems the cartridges are stored in magazines, usually with ten cartridges per magazine. Such magazine storage would have to be reconfigured if wider tape, and thus wider cartridges, were employed.

Another problem is that increasing the tape width also increases the air cushion which is unavoidably created between the exterior surface of the tape on the take-up reel and the incoming tape which is being wound onto the take-up reel. In the confined V-shaped space at this location, air which is carried along the surfaces of the rapidly-moving tape becomes entrapped and forms a cushion which pushes the incoming tape slightly away from the wound tape. Increasing the width of the tape would make this trapped volume larger, and thereby increase the cushion effect. This may result in the tape not being firmly wound onto the take-up reel, which can subsequently result in a tape pack shift if the cartridge is subsequently subjected to shock and vibration. As is known to those of skill in this art, a tape pack shift can result in the occurrence of mistracking when the tape is subsequently unwound and read.

Another theoretical way to increase the data transfer rate is to use an increased number of write/read heads in parallel. It is well-known, however, that the manufacturing yield of conventional heads decreases, often dramatically, as the number of channels accommodated within the head increases. Employing a wider tape would require the use of an increased number of heads operating in parallel to adequately cover the increased tape width.

Another problem associated with increasing the tape width is that the head-to-tape contact pressure is very difficult to maintain uniformly from the lower tape edge to the upper tape edge. This is due to head tilt (zenith) tolerances and tape transverse cupping and tension.

SUMMARY OF THE INVENTION

It is an object of the present invention to provide a tape cartridge and a tape drive wherein access time is improved without decreasing the amount of data stored in the tape cartridge and without resorting to increasing the tape width.

The above object is achieved in accordance with the principles of the present invention in a tape cartridge and a tape drive wherein multiple tapes are wound in the tape cartridge and are caused to traverse an opening in the tape cartridge separated (spaced) from each other. In the tape drive, a number of separate data transfer heads are employed, which are carried in common on a platform. The platform is movable into the opening in the tape cartridge so that the heads respectively simultaneously engage the multiple tapes in the cartridge.

The heads may be read/write heads of the type conventionally employed for reading data from and writing data onto a magnetic tape. Any suitable type of data transfer head can be employed, however, such as optically operating heads or any other type of inductive heads.

In general, the inventive tape cartridge and drive allow multiple tapes to be written and read simultaneously in one drive unit. The access time is accordingly reduced by a factor which is equal to the number of tapes which are employed. If the cartridge contains ten tapes, for example, the access time will be improved by a factor of ten. This is because the tape length of each tape will (in this example) be reduced to 1/10 of a conventional single tape having the same total surface area as the ten tapes in the inventive cartridge. For example, a conventional magnetic tape, which is ½" wide and has a length of 12,000 feet, can be cut into three separate tapes. These three tapes, each 400 feet in length, are then wound overlapping each other onto a single tape hub until that tape hub becomes fully loaded with tape. The three free tape ends are then attached to a take-up hub in the cassette. At some location between the two hubs, such as a location centrally between the hubs, the three tapes traverse an opening in the cartridge housing, at which location they are exposed to the exterior of the cartridge. Within this opening, the tapes are separated, so that there is a space between each two adjacent tapes. This space allows a recording/retrieving head to be inserted into the opening engagement with that tape. As noted above, multiple heads are carried on a single platform in common, so that they are simultaneously movable into engagement with all of the tapes. The manner of data transfer (i.e., recording and retrieval (takes place for each tape/head combination employing any of numerous known techniques).

The overall size of the tape cartridge remains the same, and the total amount (length) of tape therein is also substantially the same, as in a conventional cartridge, and therefore there is no significant cost increase in the cartridge or the tape media relative to a conventional single-tape cartridge. In the above example, however, since three tapes are three heads are simultaneously employed, the access time will be improved by a factor of three.

If a multiple-channel head of the type employed in combination with a conventional single tape cartridge is used, the number of head channels will be increased by a factor of three as well, and thus the transfer rate will also be increased.

If one would attempt to achieve the same results by increasing the width of a conventional tape, assuming the increased-width tape would also be 400 feet long, such an increased width tape would have to have a width of 12.7×3=38.1 mm. It would be impossible to implement a tape of such a width using standardized form factors. Moreover, for the reasons noted above, employing a tape having such a width would require a reduction in the winding speed, because of the air cushion problem, and for the reasons noted above, the head-to-tape contact problems would also be aggravated.

By using many tapes and many heads, the access time in accordance with the invention can be made so fast that it may be possible to employ the multiple-tape cartridge and drive of the invention as a substitution for hard disk drives and/or optical disk drives. In such instances, it is possible to use multiple tapes as a non-removable storage medium with a very high storage capacity. The inventive multi-tape cartridge and drive are not limited for use in data storage applications. The inventive tape cartridge and drive will be attractive for multimedia and video use as well.

DESCRIPTION OF THE PREFERRED EMBODIMENTS

Figure 1:
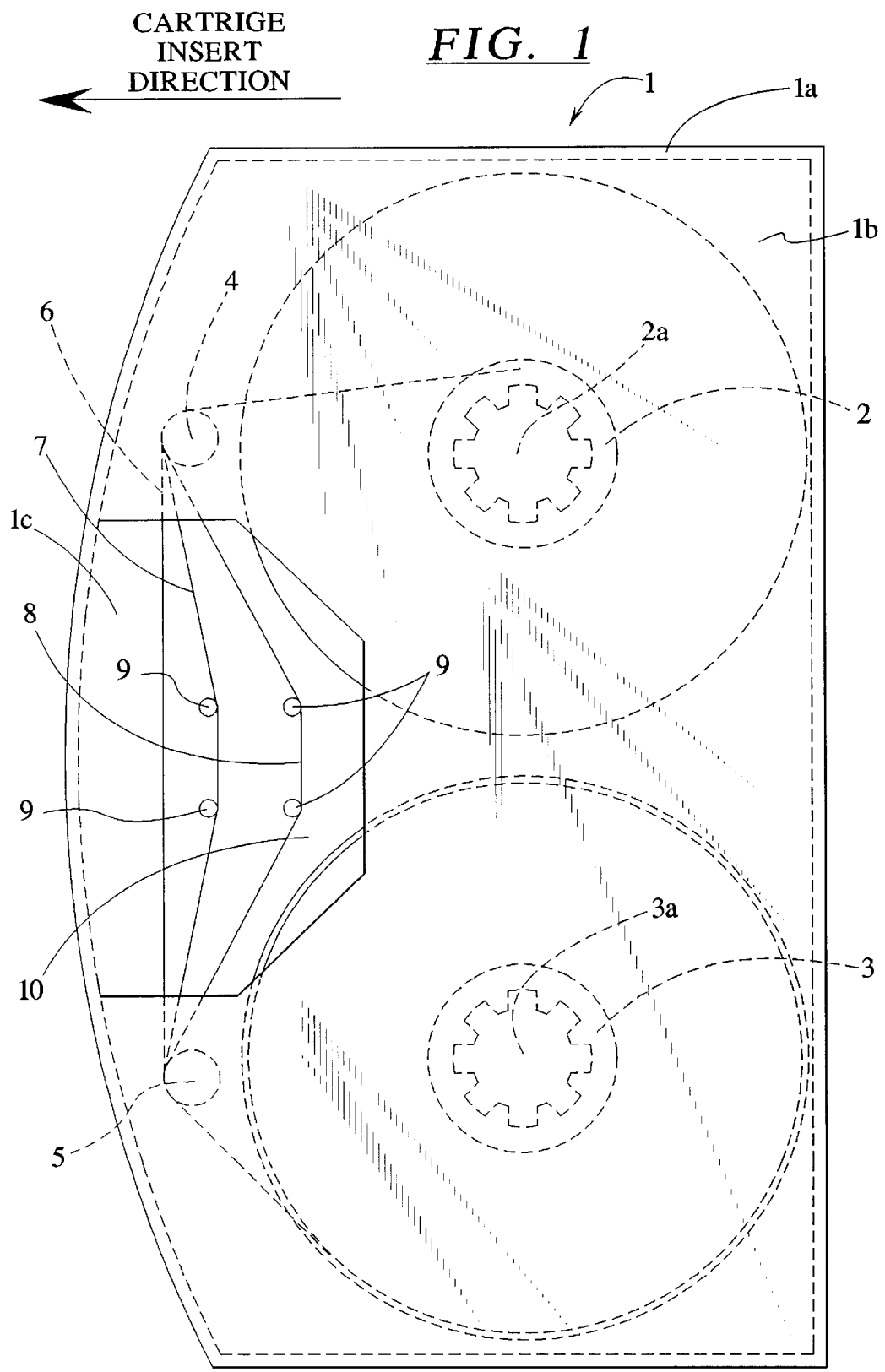
FIG. 1 is a bottom view of a multi-tape cartridge constructed in accordance with the principles of the present invention, in an embodiment employing three tapes.

A multi-tape cartridge is shown as seen from below in FIG. 1. The cartridge has a cartridge housing 1 with sidewalls 1a extending between opposite faces, one of those faces being the bottom face 1b and the other being the top face 1c. The bottom face 1b has an opening 10 therein, through which a portion of the top face 1c can be seen.

The housing 1 contains hubs 2 and 3 rotatably mounted therein. The hubs respectively rotate around center axes 2a and 3a, which extend substantially perpendicularly between the bottom face 1b and the upper face 1c. The interiors of the hubs 2 and 3 are configured to receive standard drive elements for drivingly rotating one or both of the hubs 2 and 3. The hub 2 in the form shown in FIG. 1 is empty; the hub 3 has multiple tapes wound thereon. In the embodiment of FIG. 1, the hub 3 has three tapes 6, 7 and 8 wound thereon. The tapes 6, 7 and 8 are wound on the hub 3 overlapping (overlying) each other. The three tapes 6, 7 and 8 are separated in unison by a guide element 5 and traverse the opening 10 after which they are guided around another guide element 4 and are connected in unison to the hub 2. The guide elements 4 and 5 extend completely between, or at least partially between, the bottom face 1b and the upper face 1c, and can be formed by projections projecting from either one or both, of those faces.

Within the opening 10, the tapes 6, 7 and 8 are separated by a number of pegs 9, so that as the tapes 6, 7 and 8 traverse the opening 10 they are respectively spaced apart from each other, so that each two adjacent tapes have a spacing therebetween. The pegs 9 project downwardly from the top face 1c. The free ends of the pegs 9 are shown as circles in FIG. 1. The tape cartridge can thus be dropped into a tape drive and the spacings between the tapes 6, 7 and 8 will be unimpeded for allowing access to the tapes 6, 7 and 8 by multiple data transfer heads (described in more detail below). In FIG. 2, which shows the cartridge of FIG. 1 with the top removed, the pegs 9 have been shown as still being present in their normal positions, as if separated from the top face 1c, but in reality if the top face 1c were removed, the pegs 9 would be removed as well.

Figure 2:
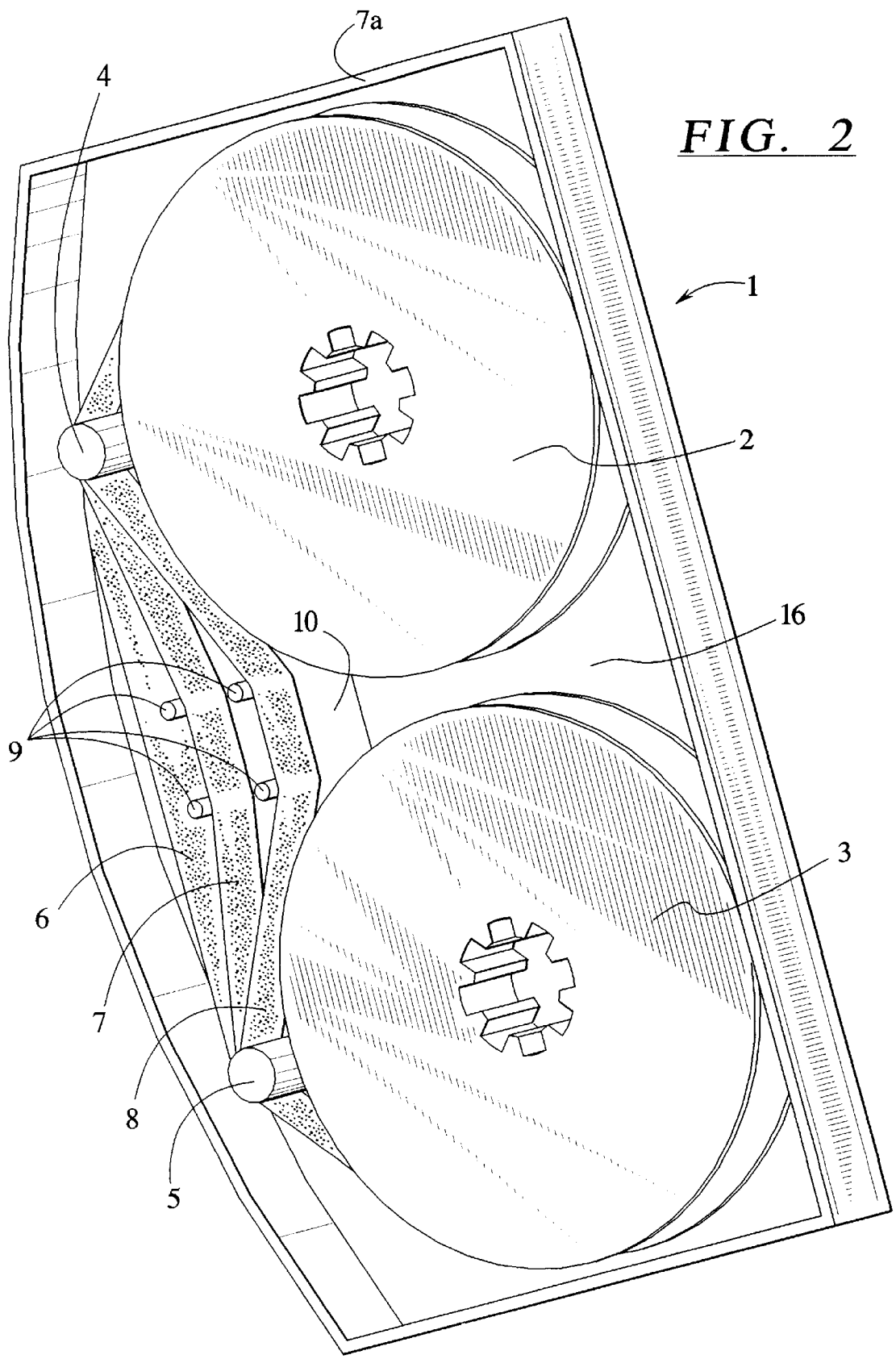
FIG. 2 is a perspective view of the cartridge of FIG. 1, with the top removed.

In the embodiment shown in FIGS. 1 and 2, the tapes 6, 7 and 8 include an outer tape 6, with the tapes 7 and 8 being inner tapes. The pegs 9 engage only these inner tapes 7 and 8, with the outer tape 6 proceeding straight across the opening 10 between the guides 4 and 5. If necessary, however, pegs 9 could be provided for engaging the outer tape 6 as well. As can be seen in FIGS. 1 and 2, each of the tapes 6, 7 and 8 has a section which is caused by the pegs 9 to be parallel to the corresponding sections of the other tapes at that location. These parallel sections may, for example, be centrally oriented within the opening 10, and the opening 10 may, for example, be centrally oriented between the hubs 2 and 3.

In the embodiment shown in FIGS. 1 and 2, three tapes 6, 7 and 8 have been shown, however, it will be understood that the invention is not limited to the use of three tapes, and any number of tapes can be accommodated within the housing 1.

Figure 3:
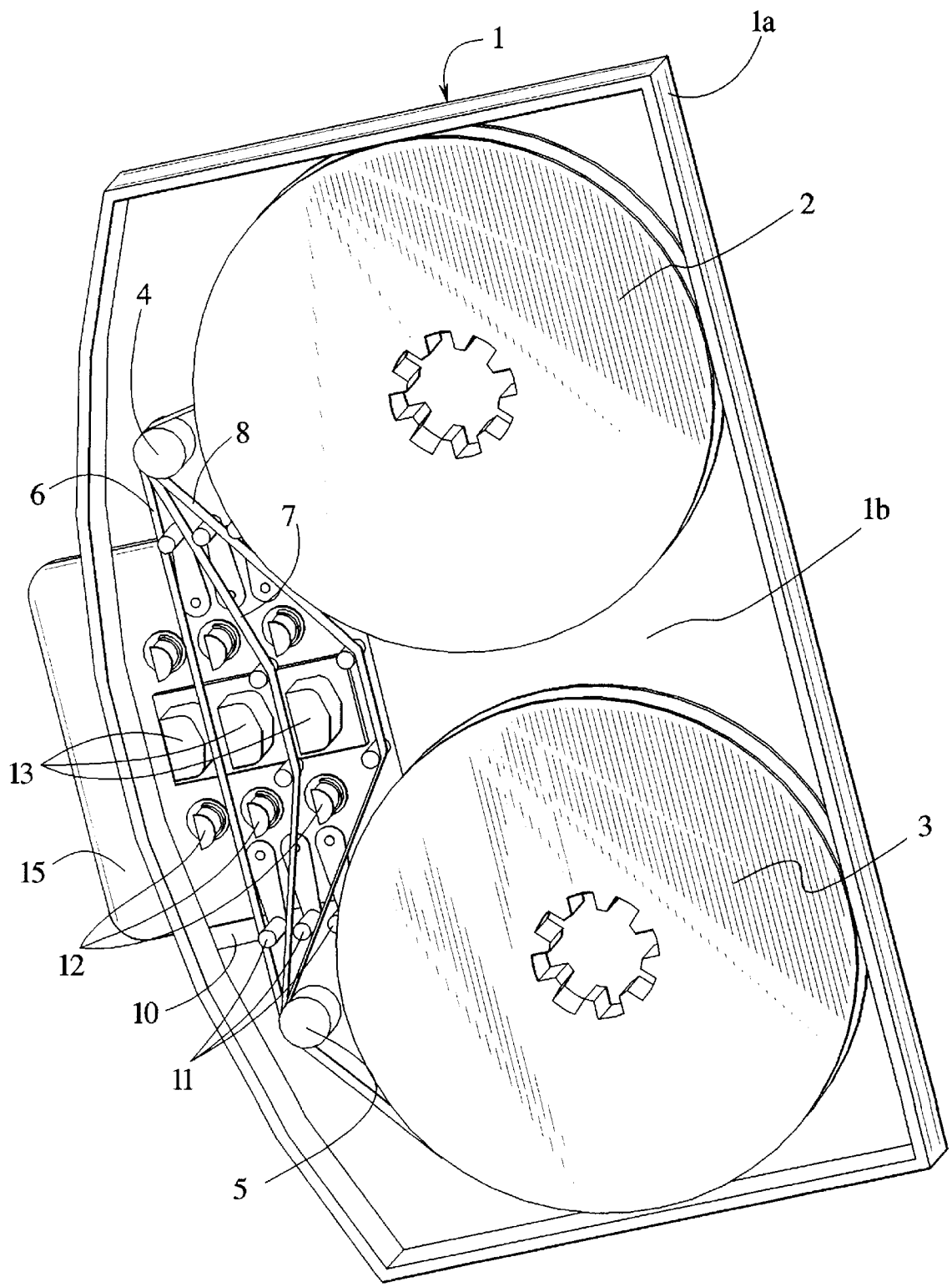
FIG. 3 is a perspective view of the multi-tape cartridge of FIGS. 1 and 2, with the top removed, from a different angle, shown interacting with a multi-head platform of a drive constructed in accordance with the principles of the present invention.
Figure 8:
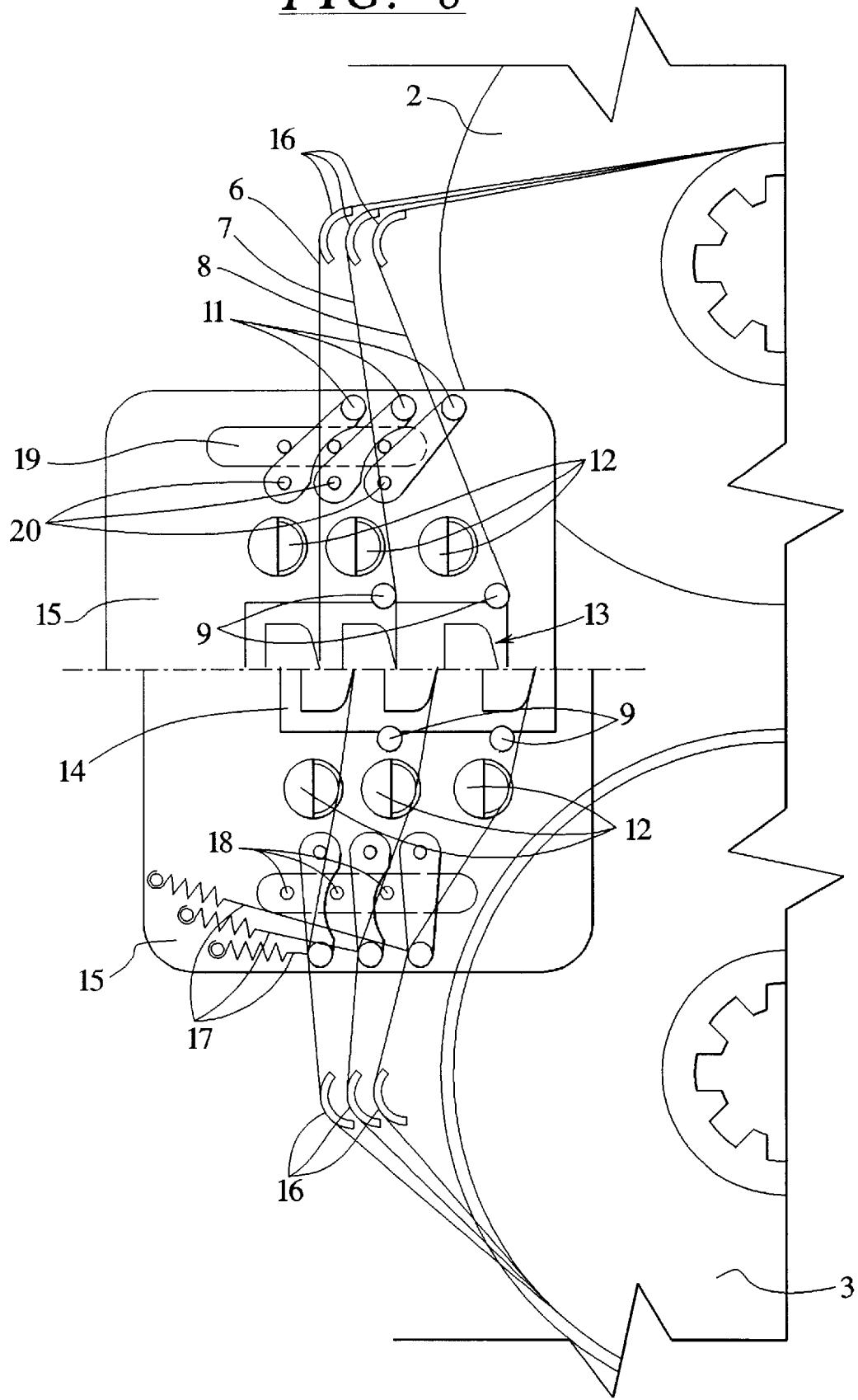
FIG. 8 is a view from above showing further details of the interaction of the tapes in the tape cartridge with the multiple heads in accordance with the invention, the upper half of the figure showing the tapes and heads in a standby position, and the lower half of the figure showing the tapes and the heads in an engaged position.

FIG. 3 shows the tape cartridge of FIGS. 1 and 2, again with the top removed but the pegs 9 remaining, engaging a portion of a tape drive constructed in accordance with the invention. The portion of the tape drive shown in FIG. 3 includes a platform 15 and a head carrier 14. The head carrier 14 has three data transfer heads 13 fixedly mounted thereon spaced from each other. The carrier 14 is movably mounted on the platform 15. The platform 15 also carries a number of tape guides 12 thereon, such as guides 12 on either side of each of the data transfer heads 13. The platform 15 also carries two sets of tape tensioners 11 for continuously tensioning the tapes 6, 7 and 8. As shown in FIG. 8, the tape tensioners 11 can be biased by springs 17, which may be tension springs or compression springs, or any other suitable type of spring. The various directions of movement which can be executed by the carrier 14 and the platform 15 are indicated by arrows 21, 22 and 23 shown in FIG. 4, which also shows a Cartesian coordinate system for describing the various movements. If the direction of movement 21 is selected (arbitrarily) as coinciding with the x-direction of the Cartesian coordinate system, then arrows 22 and 23 indicate movement in the z-direction. By moving the platform 15 in the direction of arrow 21, the carrier 14 with the heads 13 thereon is moved toward to the tapes 6, 7 and 8, i.e., from the standby position shown in FIG. 4 to the engaged position shown in FIG. 5. The platform 15 can also be moved upwardly and downwardly in the directions of the arrow 22, for coarsely adjusting the positions of the heads 13 relative to the data tracks on the tapes 6, 7 and 8. A fine adjustment of the heads 13 relative to those tracks can then be undertaken, also in the z-direction, as indicated by the arrow 23, by moving the carrier 14 and thus simultaneously moving all of the heads 13.

Figure 4:
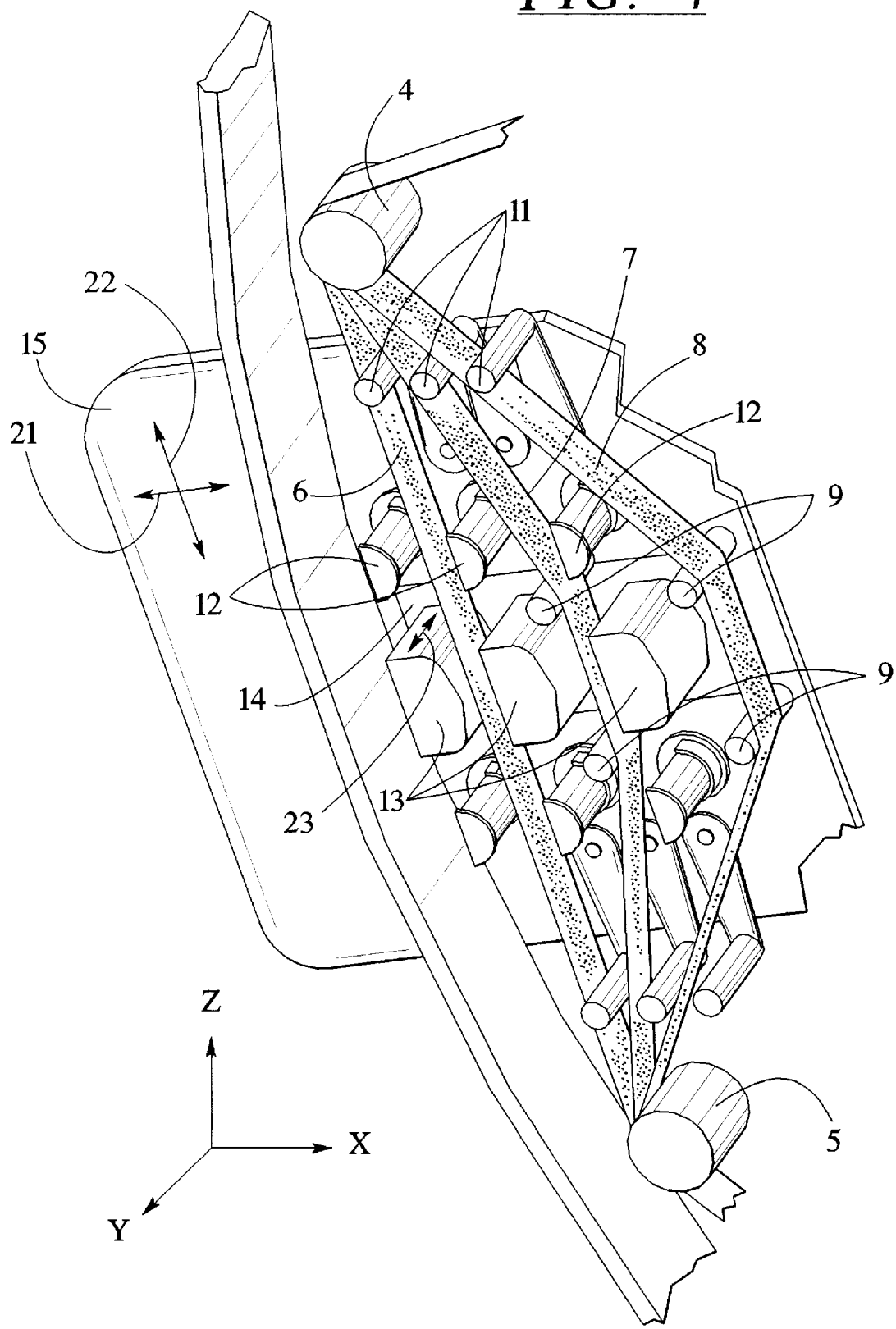
FIG. 4 is an enlarged view of a portion of the tape and drive combination of FIG. 3, with directions of movement of the platform and the head carrier being shown.
Figure 5:
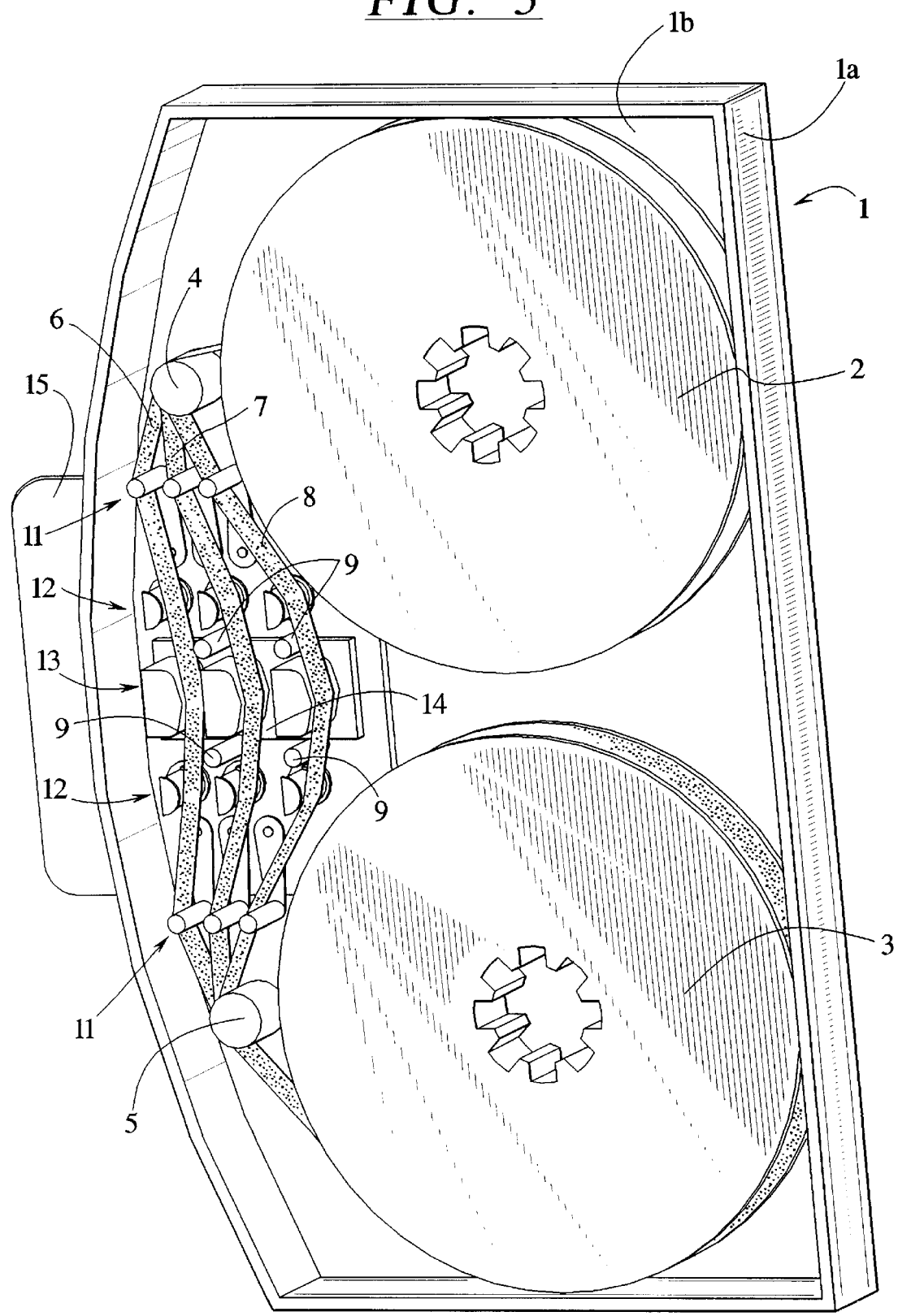
FIG. 5 is the same view of the cartridge and drive combination of FIG. 3, but with the heads engaging the tapes.

As shown in FIGS. 4 and 5, the separated tapes 6, 7 and 8 are maintained apart by the pegs 9 in the standby position shown in FIG. 4, and are guided by the guides 12 when in the engaged position shown in FIG. 5. The tape tensioners 15 maintain appropriate tension for each of the tapes 6, 7 and 8 as they are transported across the opening 10.

In addition to the use of the pegs 9, separation of the tapes 6, 7 and 8 can be facilitated by using separate sets of curved guide elements 16 in place of the guide elements 4 and 5. Selected components of the cartridge and the drive for illustrating this embodiment are shown as seen from above in FIG. 6, and in a perspective view in FIG. 7.

Figure 6:
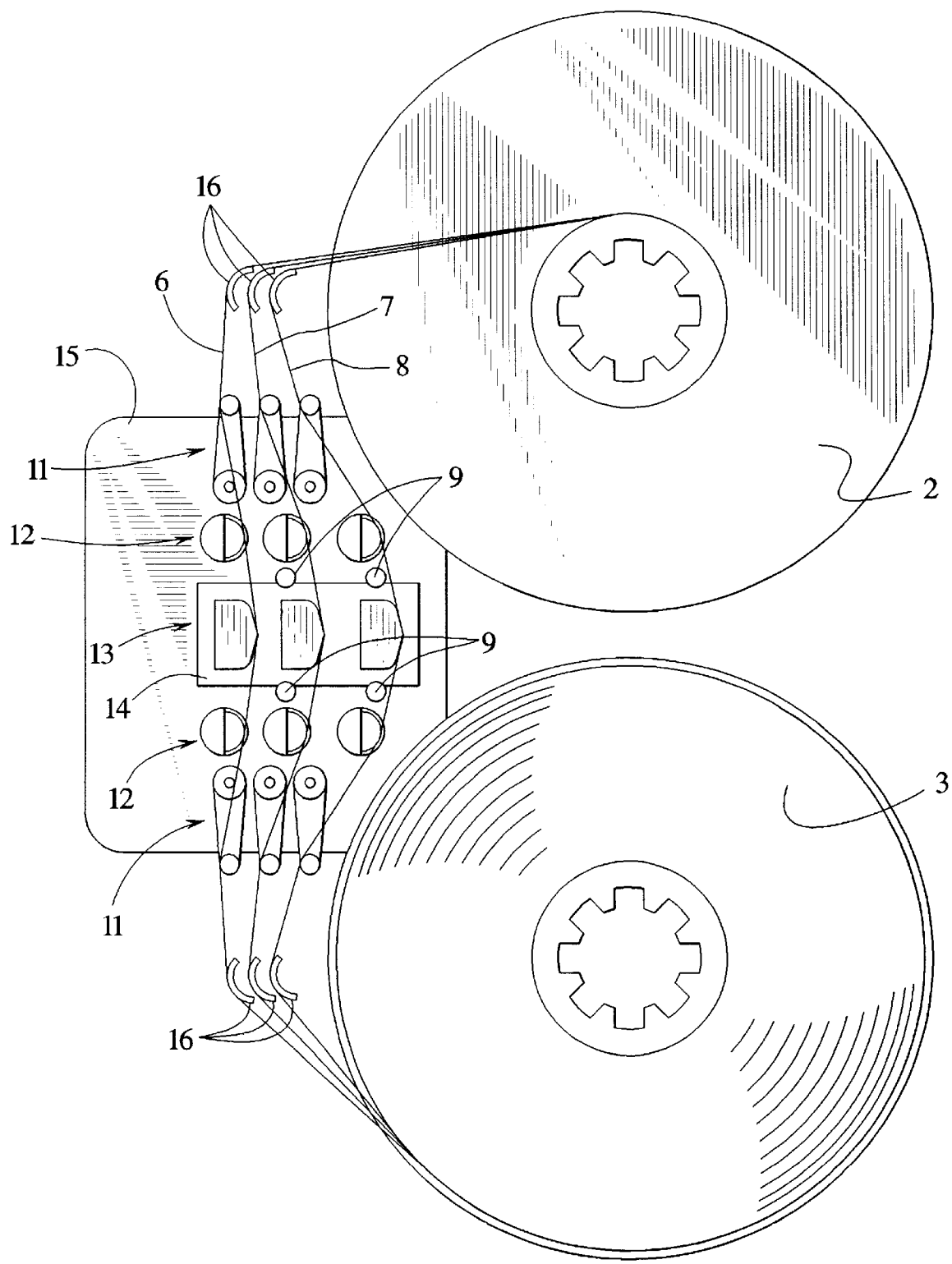
FIG. 6 is a plan view of relevant components of an inventive tape cartridge and drive system, showing a further embodiment for separating the multiple tapes.
Figure 7:
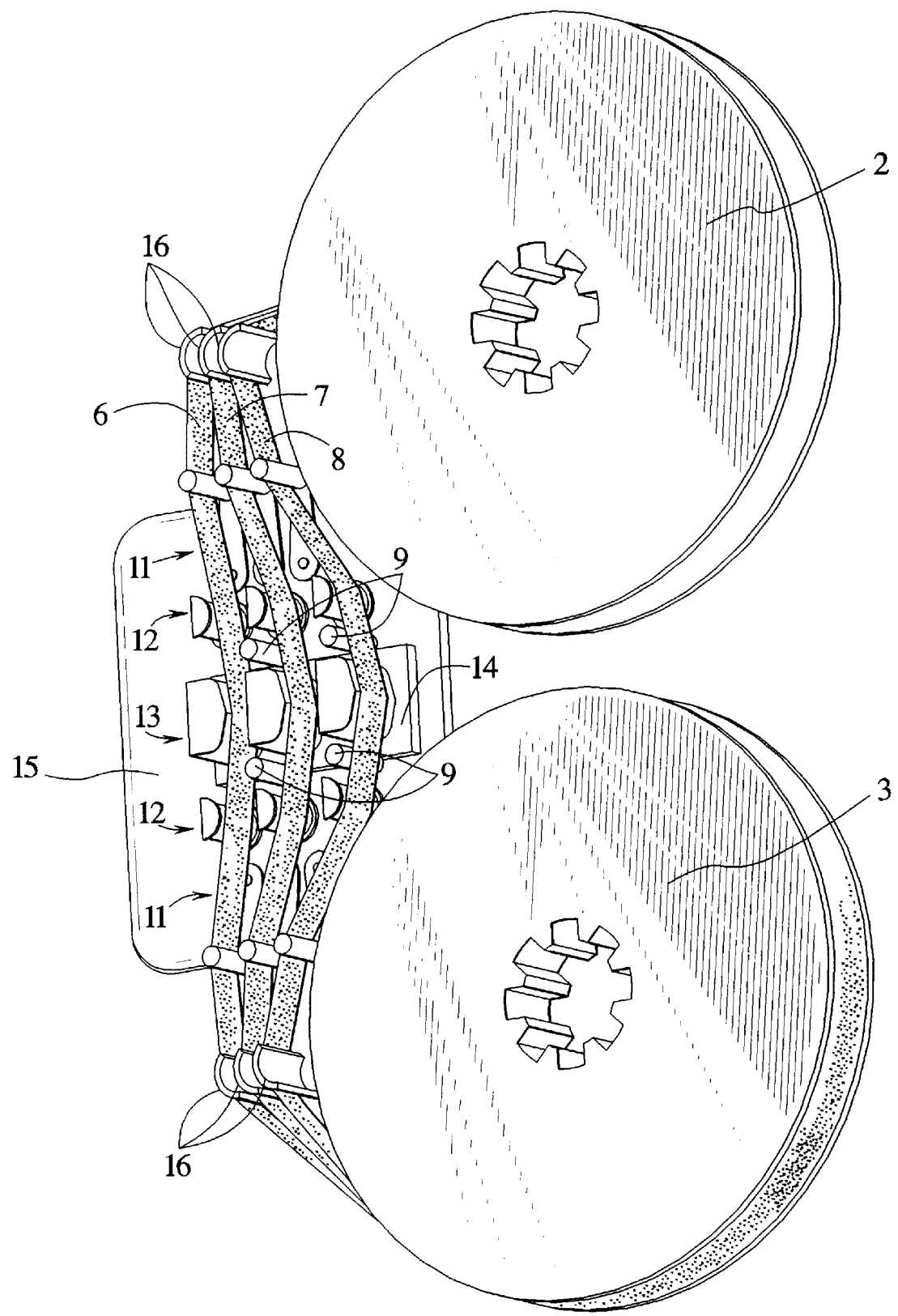
FIG. 7 is a perspective view of the components shown in FIG. 6.

FIG. 8 shows further details of selected components in the embodiment of FIGS. 6 and 7, with the lower half of FIG. 8 showing the data transfer heads 13 in the standby position, and the upper half of FIG. 8 showing the data transfer heads 13 in the engaged position. As also shown in the embodiment of FIG. 8, the platform 15 has slotted openings 19 therein, through which fixed pins 18 project. The pins 18 are fixedly mounted, for example, to the drive chassis, and serve to limit the movement of the pivoting tape tensioners 11. The tape tensioners 11 pivot around axles 20. It is, of course, possible to terminate the platform 15 at the sides just beyond the location at which the axles 20 are mounted, in which case the pins 18 would be free to project beyond the opposite sides of the platform 15, and the slots would not then be necessary. In the embodiment of FIG. 8, however, the platform 15 projects outwardly by a sufficient distance to allow anchoring of the aforementioned springs 17 on the platform 15.

The multi-tape cartridge can be dropped from above into a holder in the drive which receives and retains the multi-tape cartridge, in which case only a very small, and perhaps no, amount of movement of the platform 15 in the direction of the arrow 22 will be necessary, assuming that the amount of movement of the carriage 14 in the directions of the arrow 23 is sufficient to provide track alignment. Alternatively, the cartridge can be inserted horizontally into the drive, in which case during insertion of the cartridge the platform 15 will be retracted below the cartridge so as to allow the cartridge to be inserted. Thereafter, the platform 15 will be moved upwardly, in the direction of the arrow 22, until the heads 13 are roughly positioned in place relative to the tapes 6, 7 and 8, and fine adjustment in the direction of the arrow 23 then takes place.

The maximum benefits of the invention are obtained when the number of heads 13 is equal to the number of tapes in the multi-tape cartridge, since the aforementioned improvement in access time is then maximized. It is possible, however, to design the drive with a number of data transfer heads 13 which is the expected maximum number that will be used, and the drive can then be employed with a tape cartridge having the same number, or fewer, tapes. If a tape cartridge is employed having fewer tapes than the number of data transfer heads 13 which exist in the drive, any data transfer heads 13 which are not in use can simply be deactivated. If three data transfer heads 13 that were available in the drive, for example, but a cartridge were employed having only two tapes therein, access time would still be improved by a factor of 2 as compared to a conventional single-tape cartridge, even though this would not be the maximum in access time improvement which could be obtained with the invention.

Although modifications and changes may be suggested by those skilled in the art, it is the intention of the inventor to embody within the patent warranted hereon all changes and modifications as reasonably and properly come within the scope of his contribution to the art.

I claim as my invention:

1. A tape cartridge comprising:

a housing having an opening wherein;

first and second hubs rotatably mounted in said housing;

a plurality of data-recording tapes, all of said tapes being wound on both of said first and second hubs overlapping each other on both of said first and second hubs and traversing said opening, said tapes all being exposed in said opening to an exterior of said housing; and means in said housing for separating said tapes for causing said tapes to traverse said opening respectively spaced from each other.

2. A tape cartridge as claimed in claim 1 wherein said plurality of data-recording tapes consists of three data-recording tapes.

3. A tape cartridge as claimed in claim 1 wherein said means for separating said tapes comprises means for causing said tapes to traverse said opening along respectively separate paths, each of said separate paths having a section and the respective sections of said separate paths being parallel.

4. A tape cartridge as claimed in claim 3 wherein said means for separating said tapes is disposed relative to said opening for orienting said respective sections of said separate paths centrally in said opening.

5. A tape cartridge as claimed in claim 1 wherein said first and second hubs are disposed on opposite sides of said opening.

6. A tape cartridge as claimed in claim 1 wherein said opening is centrally disposed between said first and second hubs.

7. A tape cartridge as claimed in claim 6 wherein said means for separating said tapes comprises means for causing said tapes to traverse said opening along respectively separate paths, each of said separate paths having a section and the respective sections of the separate paths being parallel, and wherein said respective sections of said separate paths are disposed centrally in said opening.

8. A tape cartridge as claimed in claim 1 wherein each of said first and second hubs has a rotational axis around which the first and second hubs respectively rotate in said housing, the respective rotational axes of said first and second hubs being substantially perpendicular to each other, and wherein said housing comprises first and second faces respectively disposed on opposite sides of said first and second hubs and being substantially perpendicular to said rotational axes.

9. A tape cartridge as claimed in claim 8 wherein said opening in said housing is in said first face and said means for separating said tapes is mounted on said second face within said opening.

10. A tape cartridge as claimed in claim 9 wherein said means for separating said tapes comprises a plurality of spaced apart pegs projecting toward said opening from said second face, said plurality of pegs being substantially parallel to said rotational axes.

11. A tape cartridge as claimed in claim 10 wherein said plurality of tapes comprises an outer tape and at least one inner tape, and wherein said plurality of pegs comprises at least one spaced peg pair, said at least one spaced peg pair engaging said at least one inner tape.

12. A tape cartridge as claimed in claim 11 wherein said at least one pair of spaced peg pair is disposed in said opening for producing a section in said at least one inner tape which is parallel to said outer tape.

13. A tape cartridge as claimed in claim 12 wherein said at least one spaced peg pair is disposed in said opening for producing said parallel section of said at least one inner tape centrally in said opening.

14. A tape cartridge as claimed in claim 11 wherein said means for separating said tapes further comprises a plurality of pairs of curved projections projecting from at least one of said first and second faces, said plurality of pairs of curved projections being equal in number to said plurality of tapes and being respectively traversed by said tapes, each of said plurality of pairs of curved projections including a first curved projection traversed by one of said plurality of tapes before said one of said plurality of tapes traverses said opening and a second curved projection traversed by said one of said tapes after said one of said tapes traverses said opening.

15. A tape cartridge as claimed in claim 1 further comprising guide means in said housing for orienting said tapes relative to said opening before and after said tapes traverse said opening.

16. A tape cartridge as claimed in claim 15 wherein each of said first and second hubs has a rotational axis around which the first and second hubs respectively rotate in said housing, the respective rotational axes of said first and second hubs being substantially perpendicular to each other, and wherein said housing comprises first and second faces respectively disposed on opposite sides of said first and second hubs and being substantially perpendicular to said rotational axes, and wherein said guide means comprises a first guide pin projecting from at least one of said first and second faces parallel to said rotational axes and traversed by said plurality of tapes before said plurality of tapes traverse said opening, and a second guide pin projecting from at least one of said first and second faces and traversed by said plurality of tapes after said plurality of tapes traverse said opening.

17. A drive for a multi-tape cartridge containing a plurality of data-recording tapes and having an opening via which said plurality of tapes are exposed to an exterior of said multi-tape cartridge, said plurality of tapes being respectively spaced from each other in respective substantially parallel tape planes in said multi-tape cartridge within said opening, said drive comprising:

a plurality of data transfer heads;

a common platform carrying all of said heads disposed at said substantially equal levels in a direction perpendicular to said platform and spaced from each other in a direction perpendicular to said tape planes;

holder means for receiving and retaining a multi-tape cartridge; and means, after a multi-tape cartridge is in said holder means, for moving said platform for simultaneously engaging at least two of said heads respectively with at least two tapes in said multi-tape cartridge with at least one of said at least two of said heads disposed between two of said tape planes.

18. A drive as claimed in claim 17 wherein said plurality of data transfer heads is equal in number to said plurality of tapes in said multi-tape cartridge, and wherein said means for moving said platform comprises means, after a multi-tape cartridge is in said holder means, for moving said platform for simultaneously engaging all of said heads respectively with all of said tapes in said multi-tape cartridge.

19. A drive as claimed in claim 17 wherein said means for moving said platform comprises means for moving said platform in directions perpendicular to said tape planes.

20. A drive as claimed in claim 17 wherein said means for moving said platform comprises means for moving said platform in first directions perpendicular to said tape planes and in second directions parallel to said tape planes and perpendicular to said first directions.

21. A drive as claimed in claim 17 further comprising a head carrier on which all of said data transfer heads are fixedly mounted, and means for mounting said head carrier on said platform for allowing relative movement between said platform and said head carrier, and wherein said at least two tapes are disposed in respective tape planes, wherein said means for moving said platform comprises means for moving said platform in first directions perpendicular to said tape planes, and said drive further comprising means for moving said head carrier in second directions parallel to said tape planes and perpendicular to said first directions.

22. A drive as claimed in claim 21 wherein said means for moving said platform comprises means for moving said platform in said second directions as well as in said first directions.

23. A drive as claimed in claim 17 further comprising means mounted on said platform individually engageable with said at least two tapes for tensioning said at least two tapes.

24. A multi-tape cartridge and drive system comprising:

a housing having an opening therein;

first and second hubs rotatably mounted in said housing;

a plurality of data recording tapes all wound on both of said first and second hubs overlapping each other on both of said first and second hubs and traversing said opening, said tapes all being exposed in said opening to an exterior of said housing;

means in said housing for separating said tapes for causing said tapes to traverse said opening respectively spaced apart from each other;

a plurality of data transfer heads;

a common platform carrying all of said heads;

holder means for receiving and retaining said housing; and means, after said housing is in said holder means, for moving said platform for simultaneously engaging at least two of said heads respectively with at least two tapes in said multi-tape housing with at least one of said at least two of said heads disposed between two of the spaced apart tapes.

25. A drive as claimed in claim 24 wherein said plurality of data transfer heads is equal in number to said plurality of tapes in said housing cartridge, and wherein said means for moving said platform comprises means, after a housing cartridge is in said holder means, for moving said platform for simultaneously engaging all of said heads respectively with all of said tapes in said housing cartridge.

26. A method for improving access time to data recorded on a tape in a tape cartridge, comprising the steps of:

recording data on a plurality of tapes;

winding all tapes in said plurality of tapes on two tape hubs in a tape cartridge with said tapes overlapping each other on both of said two tape hubs;

separating said plurality of tapes between said tape hubs in said cartridge and causing the separated tapes to traverse an opening in said cartridge spaced apart from each other;

inserting a plurality of data transfer heads into said opening and engaging at least two of said data transfer heads respectively with at least two of said tapes with at least one of said at least two data transfer heads disposed between two of said spaced apart tapes; and simultaneously reading said data from said at least two of said tapes using said at least two of said data transfer heads.

27. A method as claimed in claim 26 wherein the step of recording said data on said plurality of tapes comprises simultaneously recording said data on the separated tapes in said cartridge using said plurality of data transfer heads.

* * * * *